(No Model.)

G. A. BOYDEN.
LOCOMOTIVE VALVE FOR AIR BRAKES.

No. 405,657. Patented June 18, 1889.

WITNESSES:
Geo. W. Whitaker
E. R. Rawley

INVENTOR:
George A. Boyden
BY Wm. Le Bailie
ATTORNEY.

UNITED STATES PATENT OFFICE.

GEORGE A. BOYDEN, OF BALTIMORE, MARYLAND, ASSIGNOR TO THE BOYDEN POWER BRAKE COMPANY, OF SAME PLACE.

LOCOMOTIVE-VALVE FOR AIR-BRAKES.

SPECIFICATION forming part of Letters Patent No. 405,657, dated June 18, 1889.

Application filed August 10, 1888. Serial No. 282,397. (No model.)

*To all whom it may concern:*

Be it known that I, GEORGE A. BOYDEN, a citizen of the United States, residing at Baltimore, in the State of Maryland, have invented certain new and useful Improvements in Locomotive-Valves for Air-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in the devices employed on locomotives whereby the engineer may control the engine and train air-brakes by the admission or release of the air-pressure thereto; and it consists of certain arrangement of parts in the engineer's valve whereby both the direct and automatic systems of air-brakes may be operated by the one device, which I accomplish by the devices hereinafter fully described and claimed, reference being had to the accompanying drawings, in which—

Figure 1:
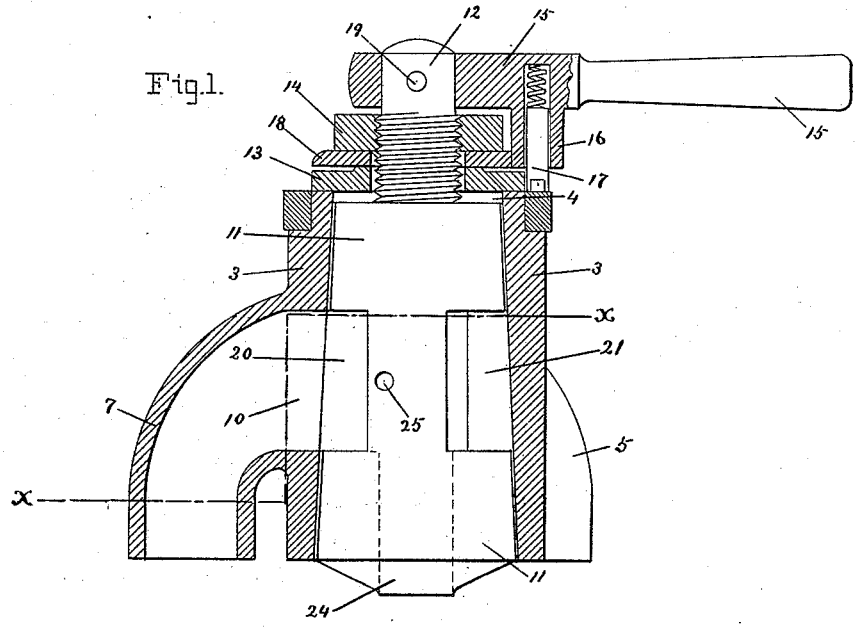
Figure 2:
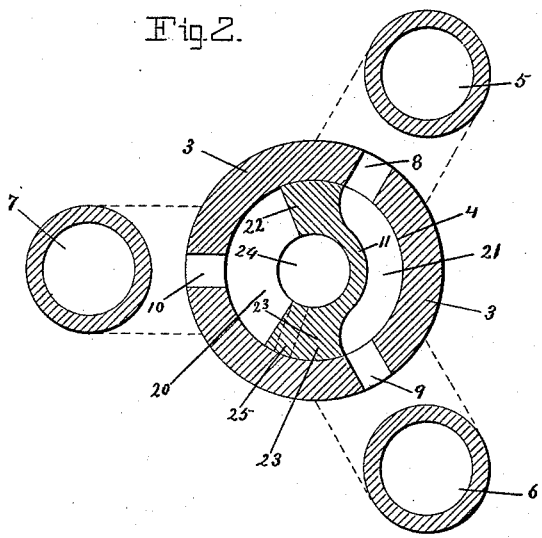

Figure 1 shows a side elevation of the cock in section, the plug thereof shown full. Fig. 2 shows cross-sections of the device, indicated by the broken line *x x* in Fig. 2.

The same figures refer to similar parts throughout the several views.

3 denotes the casing of the cock, which has therein the central bore 4, both ends of the casing being made open, and the larger part of the bore being at the bottom. Projecting from the casing are the pipes 5, 6, and 7, which are placed on the outer surface thereof, equal distance one from the other, turned downward, as shown in Fig. 1, and communicating with the interior of the casing through their respective ports 8, 9, and 10, the pipe 5 being connected to the air-storage tank, wherethrough the supply of air will be admitted to the interior of the casing through the port 8. The pipe 6 is connected to the train-pipe, whereby the air may be supplied to or released from the automatic brakes of the train through the port 9 and the pipe 7, being connected to the direct-brake mechanism of the locomotive, whereby air may be admitted or released through the port 10 to operate this brake on the direct-acting principle. In order to control the admission or release of the air-pressure through the said ports 8, 9, and 10, the plug 11 is fitted steam-tight in the casing 4, and held therein by the spindle 12, which is extended through the cap 13 of the casing, the said spindle being threaded to suit the nut 14, by which the plug is drawn to the proper degree of tightness in the casing. Attached to the spindle 12 by means of a set-screw 19 is a handle 15 for operating the plug, a boss 16 being provided thereon in which is a suitable spring stop-pin 17 to hold the handle in the desired position. To lock the nut 14 in position, a loose washer 18 is placed thereunder, which rests upon the cap 13, and is caused to turn in unison with the handle 15 by the boss 16 thereof engaging in a suitable groove or recess in the said loose washer, whereby the said nut will be securely locked between the handle 15 and the washer 18. To open and close communication between the said ports 8, 9, and 10, the plug 11 is cut away on opposite sides thereof to the form shown in Fig. 2, whereby the recesses 20 and 21 will be formed therein by the remaining walls 22 and 23 of the plug, the said recesses being of a depth equal to and corresponding with the said ports 8, 9, and 10. Communicating with the recess 20, and extended through the center of the plug to the bottom thereof, is the exhaust-port 24, which is open to the atmosphere, an additional communication being made with the said exhaust-port 24 by the small hole 25, which passes through the wall 23 of the plug thereto, for a purpose which will presently appear.

The manner of operating is as follows: In the position shown in Fig. 2 the port 8, that communicates with the air-storage tank, is open to the port 9 through the recess 21 of the plug, whereby the air-pressure will be admitted to the train-pipe and to the automatic brake mechanism of the train and the brakes thereof released, the port 10, which communicates through the pipe 7 with the direct engine-brake, being open to the atmosphere through the recess 20 and the central exhaust-port 24 in the plug, whereby the pressure on the mechanism of the direct-acting brake is off and the brakes thereof released.

When it is desired to graduate or partially apply the automatic brakes of the train, the plug 11 is turned so that the small port 25 in the wall 23 of the plug is open to the port 9, whereby the air in the train-pipe will be gradually released through the small port 25, escaping to the atmosphere through the exhaust-port 24, and these automatic brakes of the train will be gradually applied, the movement having closed the communication between the supply-port 8 and the port 9 by the wall 23 of the plug being placed therebetween and the passage through the recess 21 closed.

To apply the automatic train-brakes fully, the plug 11 is moved sufficiently far to cause the wall 23 to first pass the port 9, whereby the air is discharged through the full opening of this port 9 and recess 20 into the exhaust-port 24, which quickly relieves the pressure in the train-pipe, and thus fully applies the automatic train-brakes.

When it is desired to apply the direct engine-brake and the automatic train-brakes fully and simultaneously, the handle 15 is moved to its extreme position, which places the wall 22 of the plug beyond the port 10, whereby is established communication between the supply-pipe 5 and the pipe 7, leading to the direct engine-brake by way of the ports 8 and 10 and the recess 21 of the plug, thus applying the engine-brake. In this position of the handle 15 the pipe 6 is in communication with the atmosphere through the port 9, recess 20, and the exhaust-port 24, thereby discharging the air from the train-pipe and applying the automatic brakes of the train.

Having described my invention and the manner of operating, what I claim, and desire to secure by United States Letters Patent, is—

The combination of the casing 3, the ports 8, 9, and 10, communicating with suitable pipes, the plug 11, provided with recesses 20 and 21, the port 25, and the exhaust-port 24, arranged to discharge the air from the plug, substantially as and for the purpose set forth.

In testimony whereof I affix my signature in presence of two witnesses.

GEORGE A. BOYDEN.

Witnesses:
 WM. LE BAILIE,
 CHAS. I. HUGHSON.